United States Patent
Oneil et al.

(10) Patent No.: US 9,577,770 B2
(45) Date of Patent: Feb. 21, 2017

(54) METHOD FOR ANALYZING THE RF PERFORMANCE OF A PROBE CARD, DETECTOR ASSEMBLY AND SYSTEM FOR ANALYZING THE RF PERFORMANCE OF A PROBE CARD

(71) Applicants: aps Solutions GmbH, Puchheim (DE); BE Precision Technology, SC Nunspeet (NL)

(72) Inventors: Paul Oneil, Puchheim (DE); Hanns-Georg Ochsenkuehn, Neumarkt/Opf. (DE); Oscar Beijert, Bl Elspeet (NL)

(73) Assignees: APS Soutions GmbH, Puchheim (DE); BE Precision Technology, SC Nunspeet (NL)

( * ) Notice: Subject to any disclaimer, the term of this patent is extended or adjusted under 35 U.S.C. 154(b) by 0 days.

(21) Appl. No.: 14/707,441

(22) Filed: May 8, 2015

(65) Prior Publication Data
US 2016/0329974 A1    Nov. 10, 2016

(51) Int. Cl.
  H04B 17/00    (2015.01)
  H04B 17/19    (2015.01)
  H04B 17/16    (2015.01)
  H04B 17/12    (2015.01)

(52) U.S. Cl.
  CPC .............. H04B 17/19 (2015.01); H04B 17/12 (2015.01); H04B 17/16 (2015.01)

(58) Field of Classification Search
  CPC ...................................................... H04B 17/19
  USPC ............................................ 455/115.2, 115.1
  See application file for complete search history.

(56) References Cited

U.S. PATENT DOCUMENTS

| | | | |
|---|---|---|---|
| 6,911,814 B2 * | 6/2005 | Miller | G01R 35/00 324/750.01 |
| 2007/0182424 A1 | 8/2007 | Benedikt et al. | |
| 2010/0213960 A1 | 8/2010 | Mok et al. | |
| 2012/0169359 A1 | 7/2012 | Kim et al. | |
| 2012/0169367 A1 | 7/2012 | Kuo et al. | |
| 2015/0276371 A1 * | 10/2015 | Xu | G01B 7/10 702/97 |

* cited by examiner

Primary Examiner — Sanh Phu
(74) Attorney, Agent, or Firm — Eschweiler & Potashnik, LLC (57) ABSTRACT

A system for analyzing a probe card comprises a signal generator adapted to generate a radio frequency test signal. a connector for inputting into the probe card the radio frequency test signal, and a detector assembly. The detector assembly comprises an RF chuck for receiving a radio frequency signal from the probe card, and a sensor configured to receive the radio frequency signal from the RF chuck. The sensor is configured to measure a magnitude of the radio frequency signal and to output a measurement signal that represents only the magnitude of the radio frequency signal. The RF chuck and the sensor are mechanically coupled.

19 Claims, 5 Drawing Sheets

METHOD FOR ANALYZING THE RF PERFORMANCE OF A PROBE CARD, DETECTOR ASSEMBLY AND SYSTEM FOR ANALYZING THE RF PERFORMANCE OF A PROBE CARD

BACKGROUND

In the manufacture of semiconductor devices such as integrated circuits, generally, the single components of the semiconductor devices are manufactured on a wafer-level. After the manufacture of the single devices has been completed, the components and the semiconductor devices are tested. For example, integrated circuit may be tested for functional defects by applying special test patterns to the integrated circuit. After testing, the wafer is diced into single dies and the functioning dies are further packaged and sold.

Usually, probe cards are used for testing the components and the semiconductor devices. In particular, the probe cards serves as an electro-mechanical interface between the component to be tested and the testing apparatus. As there is a growing requirement for RF components and devices, the need to characterize the RF performance of a probe card increases.

The performance and the electrical characteristics of the probe cards are important for assessing the real characteristics of the components to be tested. Accordingly, there is a need for a method and a system for measuring and quantifying the RF performance of a probe card.

SUMMARY

According to an embodiment, a method of analyzing a probe card comprises inputting into the probe card a radio frequency test signal, receiving from the probe card a transmitted signal in response to the inputted radio frequency test signal, measuring a magnitude of the transmitted signal, and outputting a measurement signal that represents only the magnitude of the transmitted signal.

According to an embodiment, a detector assembly comprises an RF chuck for receiving a radio frequency signal from a probe card, and a sensor configured to receive the radio frequency signal from the RF chuck. The sensor is configured to measure a magnitude of the radio frequency signal and to output a measurement signal that represents only the magnitude of the radio frequency signal. The RF chuck and the sensor are mechanically coupled.

According to an embodiment, a computer program product comprises computer program code means that are adapted to cause a radio frequency test signal of known frequency and known power level to be input into a probe card, to cause a sensor to receive from the probe card a transmitted signal in response to the inputted radio frequency test signal, and to cause the sensor to output a measurement signal that represents only the magnitude of the received signal, when the program is run on a computer.

The accompanying drawings are included to provide a further understanding of embodiments of the invention and are incorporated in and constitute a part of this specification. The drawings illustrate the embodiments of the present invention and together with the description serve to explain the principles. Other embodiments of the invention and many of the intended advantages will be readily appreciated, as they become better understood by reference to the following detailed description. The elements of the drawings are not necessarily to scale relative to each other. Like reference numbers designate corresponding similar parts.

Those skilled in the art will recognize additional features and advantages upon reading the following detailed description and on viewing the accompanying drawings.

DETAILED DESCRIPTION

In the following detailed description reference is made to the accompanying drawings, which form a part hereof and in which are illustrated by way of illustration specific embodiments in which the invention may be practiced. In this regard, directional terminology such as "top", "bottom", "front", "back", "leading", "trailing" etc. is used with reference to the orientation of the Figures being described. Since components of embodiments of the invention can be positioned in a number of different orientations, the directional terminology is used for purposes of illustration and is in no way limiting. It is to be understood that other embodiments may be utilized and structural or logical changes may be made without departing from the scope defined by the claims.

The description of the embodiments is not limiting. In particular, elements of the embodiments described hereinafter may be combined with elements of different embodiments.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

As employed in this specification, the terms "coupled" and/or "electrically coupled" are not meant to mean that the elements must be directly coupled together—intervening elements may be provided between the "coupled" or "electrically coupled" elements. Likewise, the term "connected" is not meant to mean that the elements must be directly connected together—intervening elements may be provided between the "connected" elements. The term "electrically connected" intends to describe a low-ohmic electric connection between the elements electrically connected together.

The terms "lateral" and "horizontal" as used in this specification intends to describe an orientation parallel to a first surface of a semiconductor substrate or semiconductor body. This can be for instance the surface of a wafer or a die.

The term "vertical" as used in this specification intends to describe an orientation which is arranged perpendicular to the first surface of the semiconductor substrate or semiconductor body.

The term "mechanically coupled" as used in this specification intends to describe that there exists an approximately fixed local relationship between a first element and a second element, when the first element and the second element are mechanically coupled. For example, this may be achieved by mounting or attaching the first element to the second element. Further, the first element and the second element may be directly or indirectly attached to a common support member. According to a further implementation, there may be a rigid interconnection element providing a mechanically coupling between the first and the second element. As is to be readily understood, the mechanically coupling may be implemented in any arbitrary manner to provide an approximately fixed local relationship.

The term "radio frequency (RF)" generally relates to frequencies larger than 1 kHz. In particular, this term refers to electromagnetic waves having a frequency larger than 1 kHz, for example 3 kHz to 300 GHz.

Signals, in particular "radio frequency signals" may comprise power signals. A power signal may be represented by the product of the time-dependent voltage and the time-dependent current. Usually, any of these signals may be represented by magnitude (or level) and phase. Alternatively, any of these signals may be represented by real part and imaginary part. Further examples of radio frequency signals may comprise electrical and magnetic field strength.

A signal generator may generate various types of periodical signals, e.g. at a fixed frequency. For example, the signal generator may generate cw ("continuous wave") signals or pulsed signals. The signal generator may generate a pure sine or a pure cosine wave at a fixed frequency. The frequency may be changed.

The term "computer" by relate to any processor-based computing entity or other device configured to process digital data, for example digital signals. Examples comprise personal computers, notebooks, personal digital assistants and any other device that is configured to process input signals or values and to output a result. For example, the computer may be integrated in the signal generator or with any other appropriate device or component of the described systems.

The term "receive a signal" as used herein is intended to comprise the case that a first component is connected to a second component so that the signal may be transmitted from the first component to the second component and vice versa.

The term "a first component is attached to a second component" does not necessarily mean that the first component and the second component are in physical contact. Intervening elements may be disposed between the first component and the second component.

As used within the context of the present specification the term "probe card" refers to an electro-mechanical interface between a test system and an electric component to be tested such as a semiconductor device or a semiconductor wafer. The probe card provides an electrical contact between the tester and the device to be tested. For example, a plurality of contact pads or bumps may be disposed on either side of the probe card. The probe card may comprise a printed circuit board and contact elements. For example, a plurality of pins may be disposed at a surface that will be in contact to the device to be tested. Further, the contacts disposed on the side adjacent to the tester may have a larger pitch so as to enable connectors to be connected.

Figure 1:
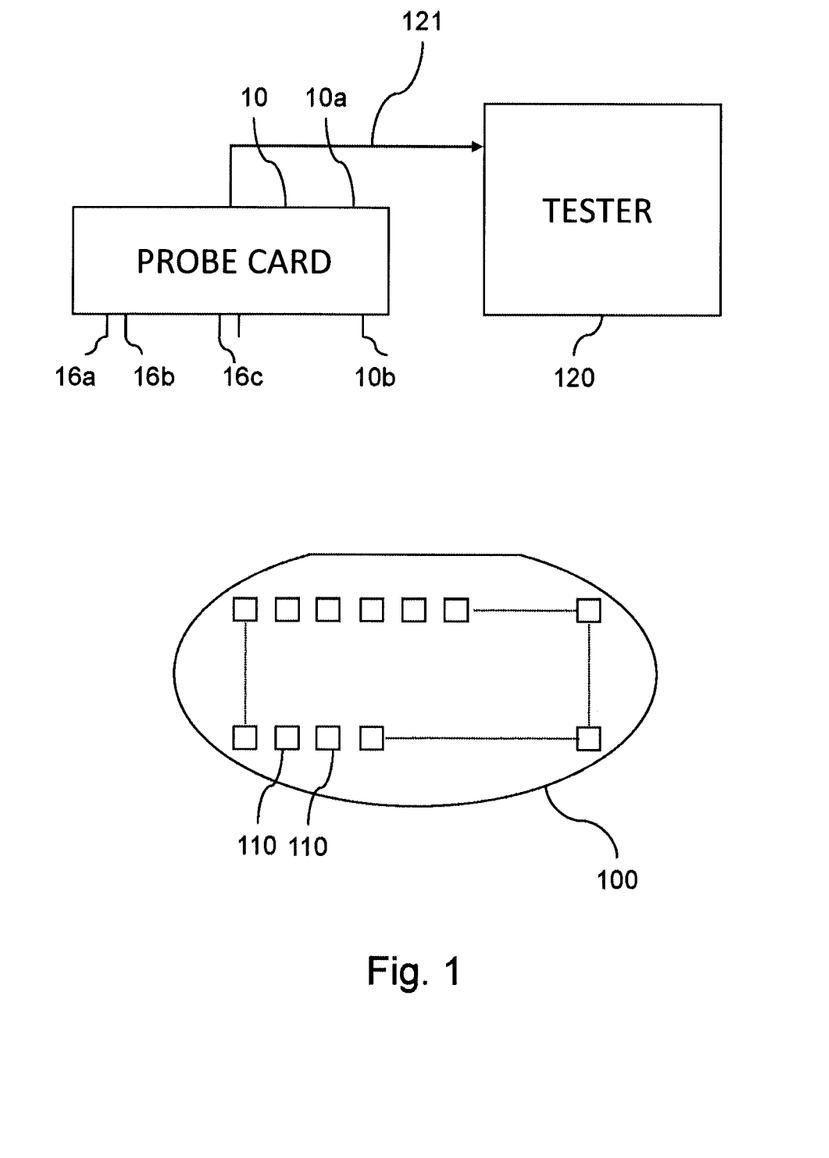
FIG. 1 shows a schematic setup of a device for testing a semiconductor wafer during the manufacture of semiconductor devices.

FIG. 1 schematically illustrates an experimental setup for performing a wafer test. The semiconductor wafer 100 comprises a plurality of single dies 110, each including an integrated circuit, a semiconductor device or other electric component. A probe card 10 includes a plurality of output pins 16a, 16b, 16c disposed on a second side 10b of the probe card. A first side 10a of the probe card is connected via a connection line 121 to a tester 120. The tester 120 applies electrical signals to the first side of the probe card 10 and measures the electrical characteristics of the single dies 110. For example, the probe card 10 may be configured to measure a plurality of dies 110 simultaneously. After measuring one or more dies 110, the wafer 100 may be moved and the next dies will be tested.

Since semiconductor based elements increasingly are used in high frequency applications such as data transmission, e.g. in mobile phones and others, there is a need of testing the dies with respect to their radio frequency properties. For example, these measurements may be made by inputting RF signals into the single dies and assessing the electrical characteristics in dependency from the frequencies. Usually, these RF signals are input via the probe card.

Accordingly, in order to achieve significant measurement results, it is desirable to know the RF characteristics of the probe card. Further, during use of the probe cards, after maintenance of the probe card the electrical characteristics of the probe cards may alter. Accordingly, there is also a need for continuously monitoring the electrical characteristics of the probe card with respect to their RF behaviour. Whilst existing metrology tools are able to measure the mechanical and basic (DC) electrical properties of a probe card, nothing seems to exist to determine the RF performance of key signal pins on the probe card.

Figure 2:
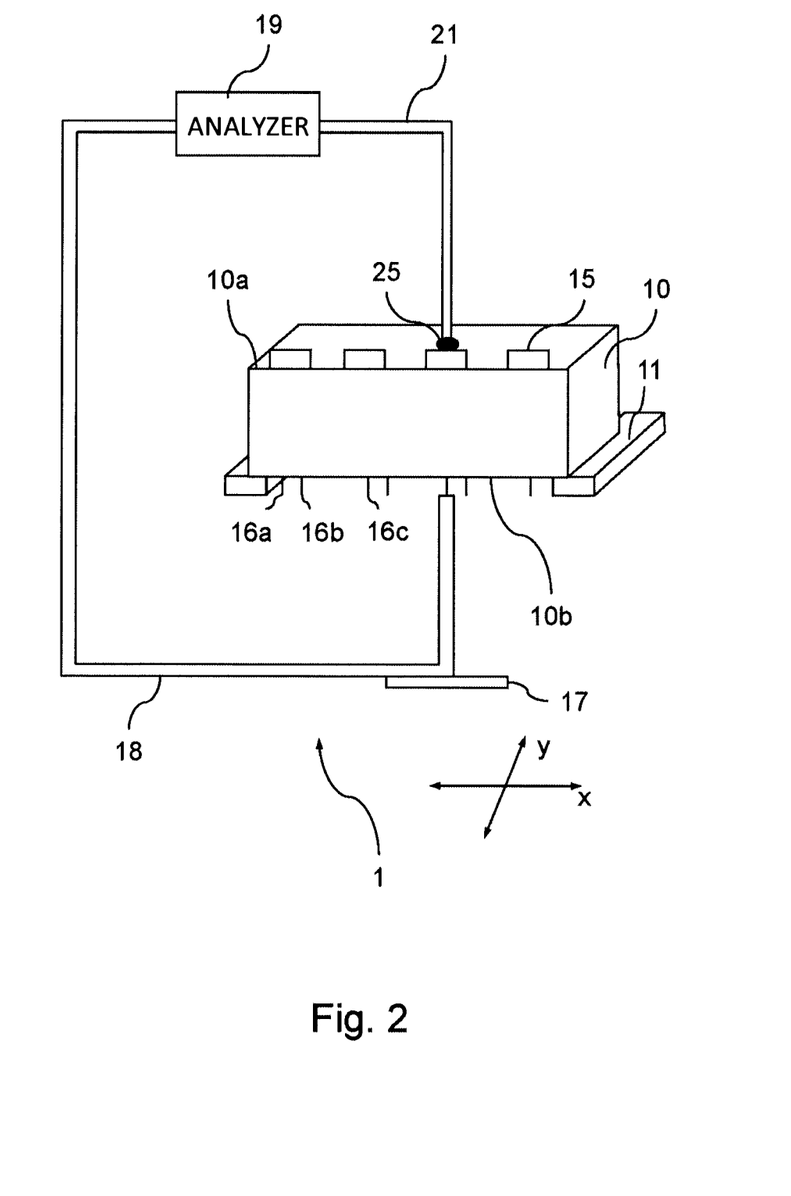
FIG. 2 shows a schematic system for analyzing a probe card.

FIG. 2 shows an example of a system for analyzing the probe card 10. The probe card comprises a plurality of RF input connectors 15 that are disposed on a first surface 10a of the probe card. Further, the probe card comprises a plurality of pins 16a, 16b, 16c at the second surface 10b of the probe card. A system for analyzing a probe card comprises a network analyzer 19 and a support member 17. An RF chuck 14 is attached to a support member 17. The RF chuck 14 may receive RF signals from a pin 16 of the probe card 10. The probe card 10 is supported by a carrier 11. For example, the carrier 11 is configured to support the edge portions of the probe card 10 so as to leave the pins 16a, 16b, 16c uncovered. The network analyzer 19 is connected via an RF cable 21 such as a coaxial cable to a connector 25 that is connected to the RF input connector 15. The network analyzer 19 outputs a radio frequency signal via the RF cable to the RF input 15. The signal that has been transmitted by the probe card 10 is received by the RF chuck 14. Then the signal is fed via the RF cable 18 to the network analyzer 19.

The support member 17 may be movable so as to connect the RF chuck 14 with any of the pins at the second side 10b of the probe card 10.

Usually, when assessing the RF characteristics of a device under a test (DUT), the scattering parameter S is determined. In particular, the radio frequency signal is input as a wave having amplitude and phase. Amplitude and Phase of the input waves, the transmitted waves and the reflected waves are determined. The respective signals are fed from the connector 25 to the network analyzer 19 and from the RF chuck 14 to the network analyzer 19. The network analyzer analyzes the amplitude and phase (or the real part and the imaginary part) of the transmitted, reflected and input waves and determines the various S parameters.

As a result, the RF characteristics of the probe card may be determined.

Figure 3:
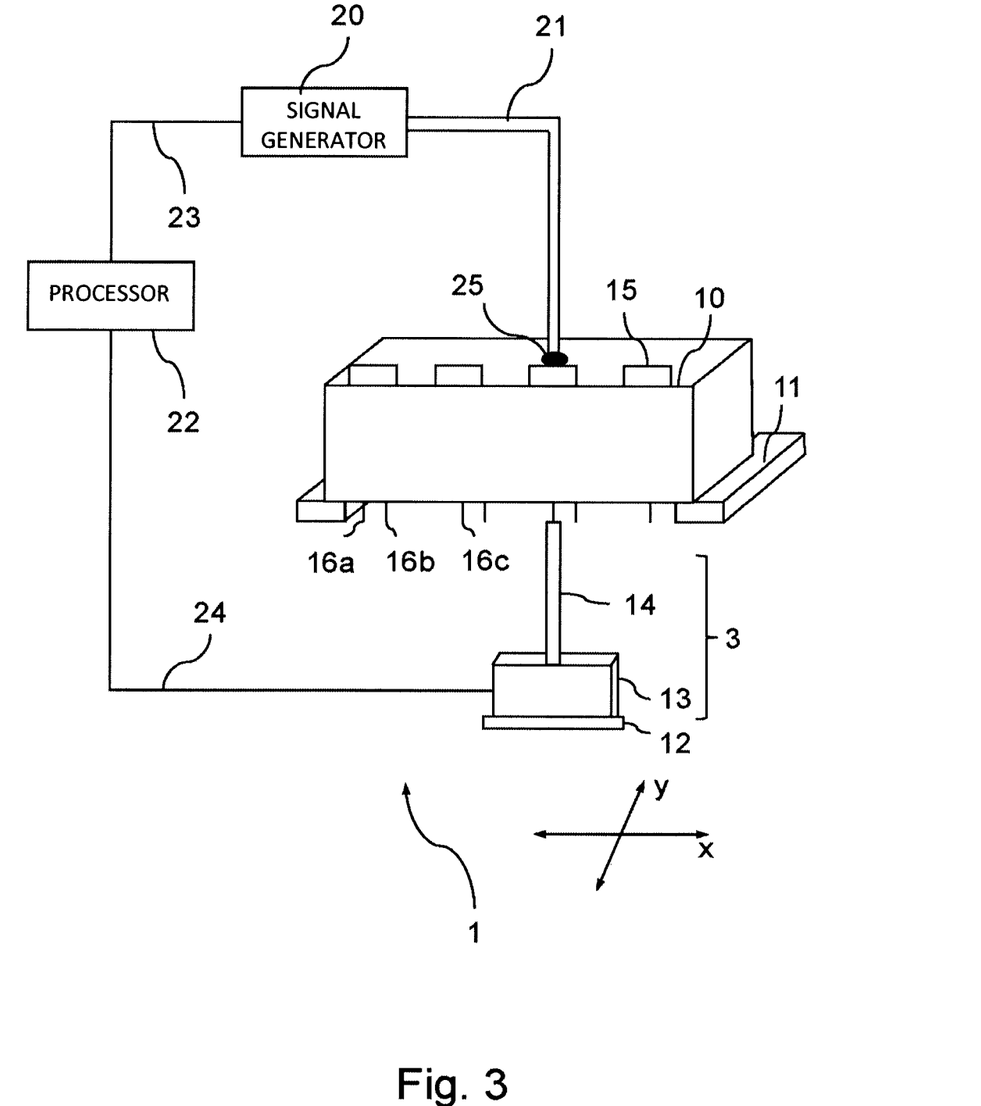
FIG. 3 shows an embodiment of a system for analyzing a probe card.

FIG. 3 shows a system 1 for analyzing an RF performance of a probe card 10 according to an embodiment. The system 1 comprises a detector assembly 3. The detector assembly comprises a RF chuck 14. The RF chuck 14 is configured to receive a periodical signal from the probe card. The detector assembly 3 further comprises a sensor 13. The sensor 13 is mechanically coupled to the RF chuck 14 and is configured to receive a periodical signal, e.g. a radio frequency signal from the RF chuck 14. The sensor 13 is configured to measure a magnitude of the periodical signal and to output a measurement signal that represents only the magnitude of the transmitted signal. Generally, RF signals are characterized by their vector properties, e.g. magnitude and phase (or real part and imaginary part). The sensor 13 described herein only outputs the magnitude and neglects the phase. The term "RF chuck" refers to a radio frequency connector element that is configured to electrically connect e.g. the pin 16 at the second surface 10b of the probe card to a connection line for transmitting the radio frequency signal. For example, the connection line may be implemented as a coaxial cable. The RF chuck 14 may comprise an inner portion (core) and an outer shielding material, both comprising a conductive material. For example, the core may be electrically connected to a pin 16 that is to be measured, and the shielding material be electrically connected to ground pins.

The system further comprises a signal generator 20 that is adapted to generate a radio frequency test signal. For example, the signal generator 20 may generate a power signal. The power signal may be output as a CW signal. For example, the signal generator may generate a pure sine wave. The signal generated by the signal generator is input into the probe card 10. For example, the system further comprises a connector 25 for inputting into the probe card 10 the periodical test signal. The connector 25 may be connected to the RF cable 21. Accordingly, the test signal is transmitted via the RF cable 21 to the connector 25 to the probe card 10. The test signal may have a certain magnitude or level, e.g. power magnitude or power level. The power level may be measured in dBm. In particular, this is an abbreviation for the power ratio in decibels (dB) of the measured power referenced to one milliwatt (mW). For example, a power level of 0 dBm corresponds to a power of 1 milliwatt.

The system may further comprise a processing element 22. For example, the processing element 22 or control element may comprise a computer. Further the signal generator 20 may be connected via a further connection line 23 to the processing element 22. The further connection line 23 may be implemented in a similar manner as the connection line 24. The processing element 22 may be configured to receive an output signal of the signal generator 20. The output signal may only indicate a magnitude of the test signal. Further, the measurement signal received by the processing element 22 also measures only the magnitude of the transmitted signal. The processing element 22 may evaluate the electrical characteristics of the probe card 10 based on the output of the signal generator 20 and the measurement signal output by the sensor 13. For example, the signal generated by the signal generator may be a power signal. Accordingly, the processing element 22 may determine a ratio of input power to transmitted power which has been measured by the sensor 13. As a result, the magnitude of probe card losses may be obtained.

The processing element may further be configured to control a frequency of the test signal that is generated by the signal generator 20. Accordingly, the ratio of transmitted power by input power may be determined in dependency from the frequency. For example, a frequency range of this measurement may be approximately 10 MHz to 6 GHz or more, e.g. 8 or 10 GHz. The frequency may be changed at steps of 10 MHz. As is to be readily appreciated, the frequency range may vary, e.g. depending on the range of frequencies for performing the wafer test. From these electrical characteristics, the RF characteristics of the probe card may be determined. For example, the ratio of input power to transmitted power may be determined so as to obtain the power losses in dependency from frequency.

According to an implementation, measurements of a calibration probe card may be used as a calibration value. According to an embodiment, if it is determined that there is a large deviation between the RF characteristics of a measured probe card and the calibration probe card, the measured probe card may be rejected or may be subjected to repair. In more detail, by comparing the RF characteristics of the measured probe card with those of a calibration probe card, it may be determined whether the probe card complies with the requirements or should be rejected or be subjected to repair.

The RF chuck 14 and the sensor 13 may be attached to a support member 12. The support member 12 is movable so that the RF chuck 14 may be moved to any desired position of the probe card. For example, the RF chuck 14 may be moved so as to be connected to any of the pins 16a, 16b, 16c. The support member 12 may be movable in a horizontal plane, e.g. parallel to an x- and y-direction. Moreover, the support member 12 may be movable in a vertical direction, e.g. the z-direction. The particular way of moving the support member 12 may be depend on the properties of the probe card analyzer. Accordingly, by moving the support member 12, the probe card 10 may be analyzed using selected ones of the pins 16a, 16b, 16c. According to the embodiment, RF chuck 14 and sensor 13 may be moved when the support member 12 is moved. As a result, individual signal paths of the probe card 10 may be tested.

Due to the fact that the sensor 13 outputs a measurement signal that represents only the magnitude of the transmitted or measured signal, the connection line 24 need not be a RF cable but may be a normal data connection such as a USB ("universal serial bus") data path. Further, since the signal transmitted by the connection line 24 is not an RF signal, the length of the cable and the topology of the cable does not largely influence the measurement. For example, the connection line 24 may be a cable comprising a USB ("universal serial bus") interface. In particular, the movable parts of the system are no longer connected to an RF cable which further increases the reliability and reproducibility of the results. Moreover, the transmitted signal is measured by the sensor 13 that is mechanically coupled to the RF chuck. Due to the fact that the sensor 13 is mechanically coupled to the RF chuck, the signal path, e.g. the length thereof, may not depend on the position of the RF chuck 14, the specific pin to be measured or the position of the sensor and thus does not substantially influence the measurement result. As a result, the measurement results will become more reliable and reproducible. Further, the system illustrated employs comparably cheap instruments such as a signal generator 20 and the sensor 13 which are much cheaper than a network analyzer according to the example shown in FIG. 2. Further, difficulties during calibration of a network analyzer according to the example shown in FIG. 3 may arise, in particular, when employing a SOLT calibration, comprising a well-defined short, open, load, and through (thru) connection for performing measurements. According to the system described herein, these difficulties may be avoided, resulting in a more reliable and reproducible measurement.

As the inventors found out, the probe card may be regarded as a passive structure. Accordingly, the phase information may be regarded as not being crucial for assessing the RF characteristics of the probe card. Therefore, the phase may be neglected and measuring only the magnitude of the transmitted signal, in particular, the magnitude of the transmitted signal in dependence from frequency is sufficient for assessing the RF characteristics of the probe card.

Figure 4:
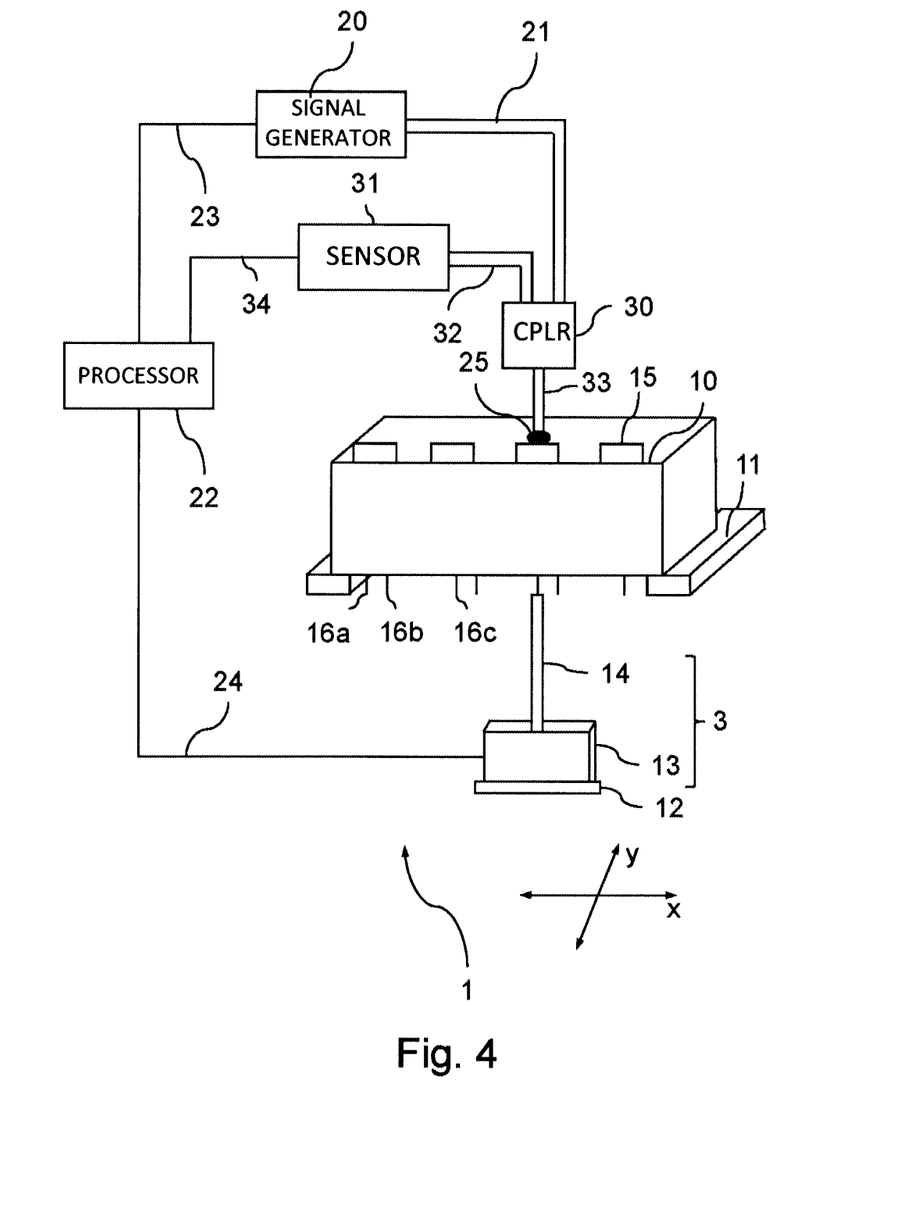
FIG. 4 shows a further embodiment of a system for analyzing a probe card.

FIG. 4 shows a further embodiment of a system for analyzing a probe card. In addition to the elements shown in FIG. 3, the system of FIG. 4 further comprises a second sensor 31 that is configured to measure a signal that has been reflected by the probe card. The second sensor 31 may be coupled via a directional coupler 30 to the RF cable. For example, a directivity of the second sensor 31 may be larger than 40 dB. In a similar manner as the sensor 13 also the second sensor 31 outputs a measurement signal that represents only the magnitude of the reflected signal. The measurement signal generated by the sensor 31 is output via a sensor connection line 34 to the processing element 22. The sensor connection line 34 may be an ordinary cable since the signal is represented only by the magnitude. The processing element 22 may further evaluate the measurement signal output by the second sensor 31. Due to the presence of the second sensor 31 further characteristics of the probe card 10 may be determined. In particular, the reliability of the measurements may be improved. For example, short circuited signal paths may be detected. Further failure analysis may be performed.

As has been described herein above, the system may be implemented in a simple manner using comparably cheap instruments. Accordingly, the system may be easily integrated within known probe card analyzers and measurements may be effected in a wafer testing environment. In particular, the probe cards may be analyzed in-situ, without sending them to an external testing facility. The processing element 22 may include a storage which stores data for calibrating the RF chuck 14 and measurement data of calibration probe cards.

As has been illustrated in FIGS. 3 and 4, a system 1 for analyzing a probe card 10 comprises a signal generator 20 that generates a RF test signal. The RF test signal is fed to a front side terminal of the probe card 10 and transmitted by the probe card 10. A sensor 13 is connected to a back side terminal of the probe card 10 and receives the transmitted signal. The sensor outputs a measurement signal that represents only the magnitude of the transmitted signal. The measurement signal may be fed to a processing element 22 that also receives an output from the signal generator. The output from the signal generator 20 may also only represent a magnitude. From a comparison of the measurement signal and the output from the signal generator that electrical characteristic of the probe card may be determined. For example, the sensor 13 may be a power sensor. For example, the front side terminal may be a RF input connector 15. The back side terminal may be a pin 16. The system may further comprise a second sensor 31 for measuring a reflected signal, as is also illustrated in FIG. 4.

The system 1 for analyzing an RF performance of a probe card as described hereinabove may further comprise elements of known probe card analyzers. In particular, the system 1 for analyzing an RF performance of a probe card may be implemented as a probe card analyzer or as a wafer prober similar to the apparatus shown in FIG. 1. The system 1 for analyzing an RF performance of a probe card may be interpreted as a scalar network analyzer—in comparison to a vector network analyzer which also takes into account the phase of the signal.

Figure 5A:
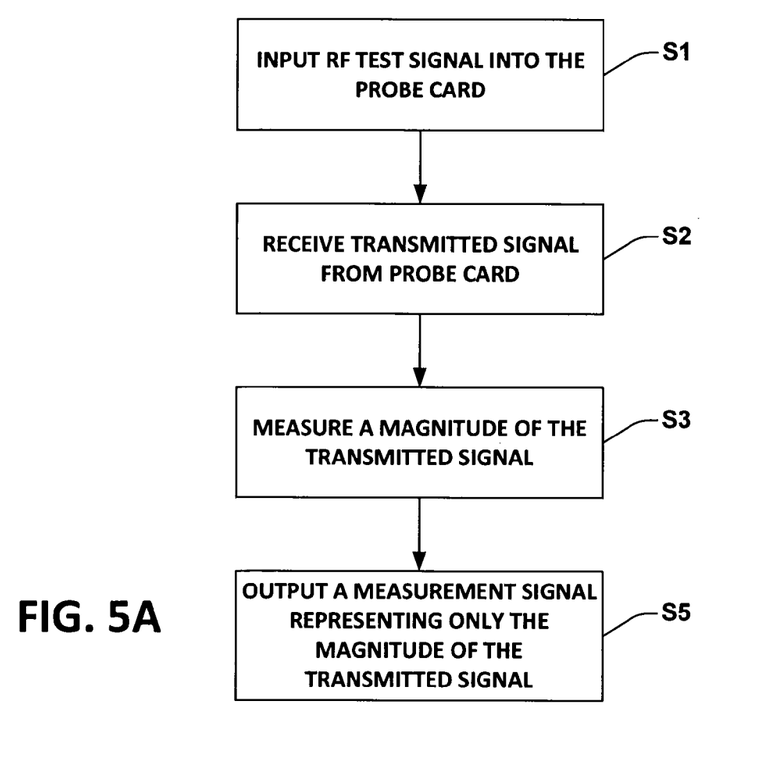
FIG. 5A summarizes a method according to an embodiment.

FIG. 5A summarizes a method of analyzing a probe card. The method comprises inputting into the probe card a radio frequency test signal (S1), receiving from the probe card a transmitted signal in response to the inputted radio frequency test signal (S2), measuring a magnitude of the transmitted signal (S3), and outputting a measurement signal (S5) that represents only the magnitude of the transmitted signal. The method may further comprise changing a frequency of the test signal after measuring the magnitude of the transmitted signal.

Figure 5B:
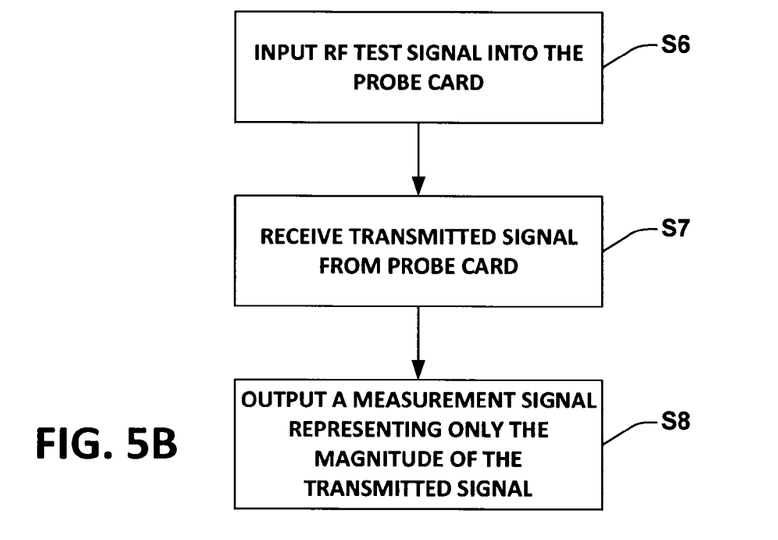
FIG. 5B summarizes a further method according to an embodiment.

According to an embodiment, a computer program product when implemented on a processing element, e.g. a computer may perform the method illustrated in FIG. 5B: causing a radio frequency test signal of known frequency and known power level to be input into a probe card (S6); causing a sensor to receive from the probe card a transmitted signal in response to the inputted radio frequency test signal (S7), and causing the sensor to output a measurement signal that represents only the magnitude of the received signal (S8). The computer program product may further cause the signal generator to generate the respective test signal and further to change a frequency of the test signal after the magnitude of the received signal has been measured.

While embodiments of the invention have been described above, it is obvious that further embodiments may be implemented. For example, further embodiments may comprise any subcombination of features recited in the claims or any subcombination of elements described in the examples given above. Accordingly, this spirit and scope of the appended claims should not be limited to the description of the embodiments contained herein.

The invention claimed is:

1. A method, performed by a system, of analyzing a probe card, comprising:
    inputting into the probe card a radio frequency test signal;
    receiving from the probe card a transmitted signal in response to the inputted radio frequency test signal, the transmitted signal comprising a magnitude and a phase;
    measuring the magnitude of the transmitted signal, and
    outputting a measurement signal that represents only the magnitude of the transmitted signal.

2. The method according to claim 1, further comprising changing a frequency of the test signal after measuring the magnitude of the transmitted signal.

3. The method according to claim 1, further comprising:
    receiving a reflected signal, the reflected signal having been reflected by the probe card in response to the inputted radio frequency test signal;
    measuring a magnitude of the reflected signal, and
    outputting a further measurement signal that represents only the magnitude of the reflected signal.

4. The method according to claim 1, further comprising comparing the measurement signal or a signal derived from the measurement signal with a calibration measurement signal obtained from a calibration probe card.

5. The method according to claim 2, further comprising deriving the magnitude or a signal derived from the measurement signal in dependency from the frequency to obtain a characteristic.

6. The method according to claim 5, further comprising comparing the characteristic with a calibration characteristic obtained from a calibration probe card.

7. A detector assembly comprising:
an RF chuck for receiving a radio frequency signal from a probe card, and
a sensor configured to receive the radio frequency signal from the RF chuck, the radio frequency signal comprising a magnitude and a phase,
the sensor being configured to measure the magnitude of the radio frequency signal and to output a measurement signal that represents only the magnitude of the radio frequency signal, and
the RF chuck and the sensor being mechanically coupled.

8. The detector assembly according to claim 7, wherein the radio frequency signal received by the sensor is a signal transmitted by the probe card in response to an inputted radio frequency test signal.

9. The detector assembly according to claim 7, wherein the RF chuck and the sensor are attached to a common support member.

10. The detector assembly according to claim 9, wherein the common support member is movable so that the RF chuck is connected to a selected pin of the probe card.

11. A system for analyzing an RF performance of a probe card, comprising:
a signal generator adapted to generate a radio frequency test signal;
a connector for inputting into the probe card the radio frequency test signal, and
a detector assembly comprising:
an RF chuck for receiving a radio frequency signal from a probe card, and
a sensor configured to receive the radio frequency signal from the RF chuck, the radio frequency signal comprising a magnitude and a phase,
the sensor being configured to measure the magnitude of the radio frequency signal and to output a measurement signal that represents only the magnitude of the radio frequency signal, and
the RF chuck and the sensor being mechanically coupled,
wherein the RF chuck is configured to receive the radio frequency signal transmitted by the probe card in response to the inputted radio frequency test signal.

12. The system according to claim 11,
wherein the signal generator is adapted to generate a power signal having a fixed frequency.

13. The system according to claim 11, further comprising a second sensor, being configured to receive a reflected signal from the probe card, the reflected signal having been reflected by the probe card in response to the inputted periodical test signal.

14. The system according to claim 11, further comprising a processing element, the processing element being configured to
receive an output of the signal generator indicating a magnitude of the generated test signal;
receive the measurement signal, and
to evaluate RF characteristics of the probe card based on the magnitude of the generated test signal and the measurement signal.

15. The system according to claim 14, the processing element further being configured to control a frequency of the signal generated by the signal generator.

16. The system according to any of claims 14, the processing element further being configured to compare the measurement signal with a calibration measurement signal obtained from a calibration probe card.

17. The system according to claim 15, further being configured to derive the magnitude in dependency from the frequency to obtain an RF characteristic.

18. The system according to claim 17, further being configured to compare the characteristic with a calibration characteristic obtained from a calibration probe card.

19. A computer program product comprising computer program code means adapted to
cause a radio frequency test signal of known frequency and known power level to be input into a probe card;
cause a sensor to receive from the probe card a transmitted signal in response to the inputted radio frequency test signal, the transmitted signal comprising a magnitude and a phase; and
cause the sensor to output a measurement signal that represents only the magnitude of the received signal,
when the computer program product is run on a computer.

* * * * *